(12) United States Patent
Pistsov

(10) Patent No.: US 9,216,623 B1
(45) Date of Patent: Dec. 22, 2015

(54) MULTIPURPOSE LOCOMOTION DEVICE

(71) Applicant: Roman Pistsov, Kostroma (RU)

(72) Inventor: Roman Pistsov, Kostroma (RU)

( * ) Notice: Subject to any disclaimer, the term of this patent is extended or adjusted under 35 U.S.C. 154(b) by 0 days.

(21) Appl. No.: 14/481,380

(22) Filed: Sep. 9, 2014

(51) Int. Cl.
*B60F 3/00* (2006.01)

(52) U.S. Cl.
CPC ............. *B60F 3/0076* (2013.01); *B60F 3/0007* (2013.01); *B60F 3/0069* (2013.01)

(58) Field of Classification Search
CPC ............................... B60F 3/0015; B60F 3/007
USPC ................................................... 440/12.5–58
See application file for complete search history.

(56) References Cited

U.S. PATENT DOCUMENTS

| | | | | |
|---|---|---|---|---|
| 3,521,595 A * | 7/1970 | Mix | ...................... | B60F 3/0076 180/190 |
| 3,646,904 A * | 3/1972 | Lanning | ................. | B60F 3/0076 114/61.22 |
| 3,707,938 A * | 1/1973 | Olson | .................... | B63B 35/731 114/55.55 |
| 4,893,692 A * | 1/1990 | Smith | ..................... | B62M 27/02 180/190 |
| 6,062,156 A * | 5/2000 | Radke | .................... | B60F 3/0076 114/123 |
| RE36,901 E * | 10/2000 | Roycroft | ................. | B60F 3/003 114/344 |
| 6,595,812 B1 * | 7/2003 | Haney | ................... | B60F 3/0015 114/360 |
| 7,040,426 B1 * | 5/2006 | Berg | ...................... | B62D 55/02 180/9.5 |
| 7,096,988 B2 * | 8/2006 | Moriyama | ............. | B62M 27/02 180/183 |
| 7,416,457 B2 * | 8/2008 | Gibbs | ................... | B60F 3/0007 440/12.52 |
| 7,673,711 B1 * | 3/2010 | Berg | ...................... | B62D 55/02 180/9.21 |
| 8,777,680 B2 * | 7/2014 | MacDonald | ............... | B63B 1/14 440/12.56 |
| 2001/0047894 A1 * | 12/2001 | Maguire | ............... | B60F 3/0007 180/9.38 |
| 2012/0216735 A1 * | 8/2012 | Bailey | ..................... | B63B 35/74 114/55.55 |

* cited by examiner

*Primary Examiner* — Lars A Olson
*Assistant Examiner* — Jovon Hayes
(74) *Attorney, Agent, or Firm* — Inventa Capital PLC

(57) ABSTRACT

A multipurpose mobility system of the present invention includes a land vehicle, a platform removable engageable with the land vehicle. The platform includes a bottom portion and a rear portion and a central axis bisecting the bottom portion and the rear portion. At least one opening defined in the bottom portion is used to receive the land vehicle thereby exposing the driving arrangements of the land vehicle to water to allow moving the land vehicle positioned on the platform on the water. The platform includes a pair of driving wheel devices connected to the rear portion and spaced from one another.

20 Claims, 17 Drawing Sheets

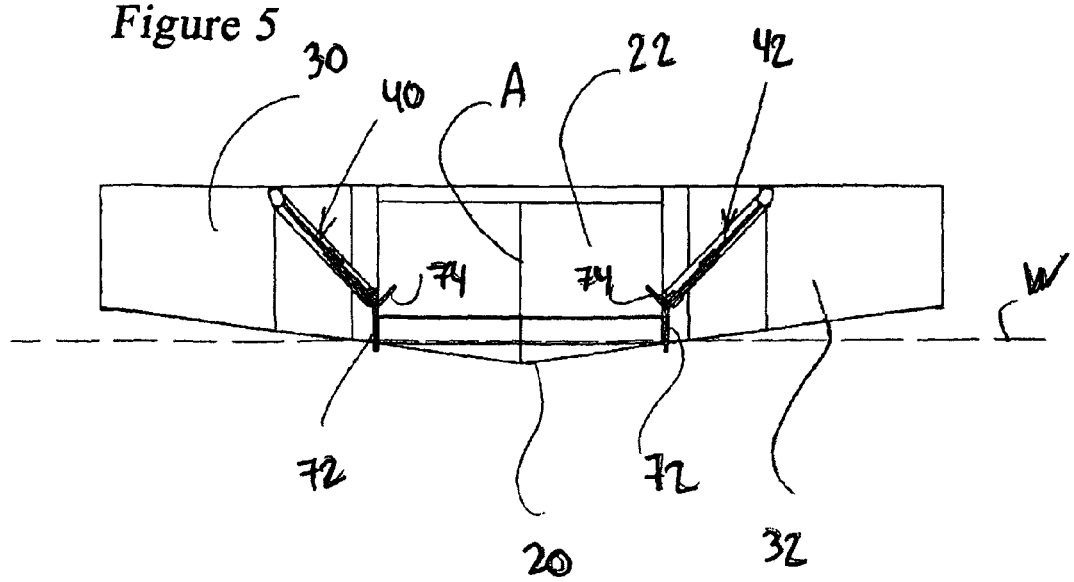

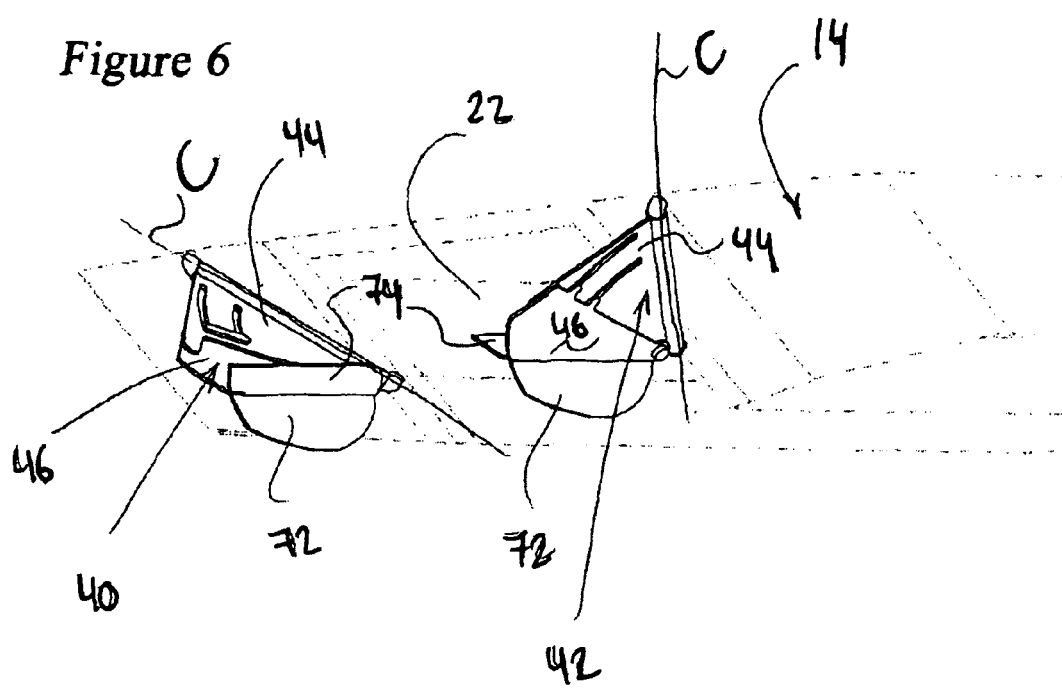

MULTIPURPOSE LOCOMOTION DEVICE

FIELD OF THE INVENTION

The present invention relates to a self propelled watercraft and more particularly to a snowmobile powered watercraft and to a structural assembly for converting a snowmobile into such a craft.

BACKGROUND OF THE INVENTION

The present invention relates to a snowmobile flotation system. In recent years snowmobiles have become very popular for recreational use. In areas of the country where the ground is snow covered for significant portions of the year they are widely used for basic off road transportation. They have also proven to be invaluable for winter search and rescue operations in the back county and mountainous terrain.

While snowmobiles are highly useful and versatile vehicles they are relatively expensive and inherently limited to use on snow covered terrain. As a result, they are limited to use in geographic areas where there is some significant annual snow fall and during periods of the year where there is at least a few inches of standing snow cover. In places where bodies of water at least partially freeze over during certain times of the year, there is often a need to travel across the frozen water. In some cases, this may be for emergency situations, such as where someone has fallen through the ice and must be reached for rescue.

In others, it may be that one's home is on an island in the middle of a frozen lake. A snowmobile can be used to travel over solid ice, but it is rare that one can traverse a frozen body of water with complete confidence that the entire body of water is consistently solidly frozen. The rider, therefore, takes the risk that the snowmobile and rider may fall through thin ice at any time. A boat, on the other hand, may be able to move through water and break through thin ice, but will have little utility on solid ice.

In the prior art, it is known to provide auxiliary flotation for a vessel such as, for example, a boat. For example, U.S. Pat. No. 4,864,961 discloses an auxiliary flotation system for a boat including a plurality of floats which may be inflated either automatically or manually from a source of pressurized gas to maintain flotation of the vessel. This different from the teachings of the present invention which contemplates incorporation of a flotation system on a device, namely a snowmobile, which is not normally expected to float during its normal mode of operation.

A boat, on the other hand, may be able to move through water and break through thin ice, but will have little utility on solid ice. Therefore, there is a need for a vehicle that allows a rider to travel both over water and over solid ice. Some progress has been made toward the development of such a vehicle and a number of patents disclose the conversion of conventional snowmobiles into aquatic vehicles.

For example, U.S. Pat. No. 3,521,595 discloses the conversion of a conventional snowmobile into an aquatic vehicle for travel on water. This conversion involves the replacement of the steerable ground engaging snow skis with a buoyant supporting and steering arrangement that includes pontoons attached to the snowmobile body in the mounting arrangement coupled to the steering linkage of the snowmobile. The pontoons are disposed relative to the engine driven endless cleat track extending lengthwise under the body such that the track functions in the water as the propulsion means.

Although this invention discloses the conversion of a snowmobile into an aquatic vehicle, it has significant disadvantages. First, the invention requires the removal of the snow skis in favor of pontoons. Such removal may be difficult and may make it difficult or impossible to replace the snow skis so that the snowmobile may eventually be used as an ordinary snowmobile again. Moreover, once converted, the only seating and storage space on the aquatic vehicle is on the snowmobile, which could make rescue operations difficult.

U.S. Pat. No. 4,893,692 discloses a floatable snowmobile made up of a one-piece molded plastic body. The body includes a rigid skin forming a shell defining an enclosed cavity in which there is provided an expanded closed-cell foam core of water-buoyant material. Floating skis are constructed as pontoons of similar construction to the body and replace the conventional snowmobile skis such that the whole snowmobile can float with a portion thereof out of the water so as to support a rider clear of the water in the event the snowmobile falls through ice. Although the U.S. Pat. No. 4,893,692 discloses a snowmobile that will not sink, it also has its disadvantages. Given its floatable construction, it is not as maneuverable as a standard snowmobile and requires significant modification in order to be converted back into a conventional snowmobile.

Like the apparatus disclosed in the U.S. Pat. No. 3,521,595, there is no seating or storage on the vehicle other than the seating and storage provided by the snowmobile, which could make rescue operations difficult. Further, and more importantly, there is no ability to effectively steer the vehicle when it is submerged in water.

Finally, U.S. Pat. No. 6,595,812 discloses an amphibious vehicle for traversing a body of water or solid terrain, such as a layer of ice floating atop a body of water. The vehicle includes a floatable boat hull having an elongate aperture therethrough, and a snowmobile for traveling over the solid terrain received in the opening and sealed in water impervious relation to the hull. The snowmobile includes an endless drive track, which supports the hull in spaced relation when travelling over solid terrain being and which rearwardly propels water to forwardly propel the vehicle through the water.

Alluding to the above, a pair of skis supports the front of the hull in spaced relation with the solid terrain being traversed and each ski includes upturned forward ends mounting upstanding rudders for steering the vehicle as it traverses a body of water. The hull includes upwardly extending, downwardly opening pockets for receiving the front upturned ends of the skis and stabilizing arms, which are coupled between the frame and the skis. Upwardly inclined guides are provided on the underside of the hull for upwardly guiding the skis out of the water onto the ice floating on the water as the vehicle exits the water and moves onto the ice.

Various additional prior art references teaches a snowmobile powered watercraft which includes a pair of forward pontoons mounted to the front suspension in place of conventional skis and an U-shaped rear pontoon mounted to the aft portion of the snowmobile body. Propulsion is provided by the endless track assembly of the snowmobile which extends in part beneath the rear pontoon. Also disclosed is a structural assembly for converting the snowmobile into a watercraft which includes the forward and rear pontoons.

Still another prior art reference, namely U.S. Pat. No. 8,678,868 teaches a pair a boat capable of having a snowmobile securely mounted on its hull and steerable by the snowmobile's steering mechanism. The boat includes a bow, an aft, a port side, a starboard side, and a mid-ship. The hull of the boat includes a top and a bottom, wherein the bottom of the hull includes under-hull skis with tips and tails, and the bottom of the hull further includes a bow step positioned proximate to the tips of the under-hull skis. The boat also includes:

a snowmobile opening including a cutaway of the hull extending into the hull from the aft and disposed halfway between the port and starboard sides; a transom disposed at the aft; and a boat steering mechanism including two boat ski attachment mechanisms on the port and starboard sides of the boat and two snowmobile ski attachment mechanisms on the port and starboard sides.

According, it is another object of this invention to provide for a structural assembly for converting a snowmobile to a self-propelled watercraft which is relatively simple and requires only minimal disassembly of the snowmobile in the conversion process.

Thus, it is a primary object of this invention to provide for a structural assembly for converting a snowmobile into a self propelled watercraft, thereby substantially extending the portion of the year during which the vehicle is useable.

SUMMARY OF THE INVENTION

A multipurpose mobility system of the present invention includes a land vehicle, a platform removable engageable with the land vehicle. A driving arrangements of the land vehicle, such as, for example, a snowmobile, thereby allowing to move the land vehicle on the platform on water. The platform includes a bottom portion and a rear portion and a central axis bisecting the bottom portion and the rear portion with at least one opening defined in the bottom portion. The driving arrangements of the land vehicle extend through the opening to water to allow moving the land vehicle positioned on the platform on water.

A pair of side portions of the platform are pivotable about each pivoting axis independent from the central axis and away from the bottom portion to compact or fold the platform thereby allowing the land vehicle to move on surfaces other than water wherein use of the platform is not required. A pair of driving wheel devices are connected to the rear portion and spaced from one another. Each of the driving wheel presents at least two elements mechanically engaged with one another thereby allowing these two elements of each of the driving wheel devices to collapse one into the other as each of the platform runs over an obstacle in a shallow water areas or when collapsing is required as the driving wheel devices are rotatable about the respective pivoting axis as the platform turns into various directions.

An advantage of the present invention is to provide a structural assembly for converting a snowmobile to a self-propelled watercraft which is relatively simple and requires only minimal conversion process.

An advantage of the present invention is to provide a structural assembly for converting a snowmobile to a self-propelled watercraft which is relatively simple and requires only minimal conversion process.

An advantage of the present invention is to provide a structural assembly for converting a snowmobile to a self-propelled watercraft which is relatively simple and requires only minimal conversion process.

These and other objects of the present invention will become readily apparent upon further review of the following specification and drawings.

Other objects, features, and advantages of the present invention will become apparent upon consideration of the following detailed description of a preferred embodiment thereof, when taken in conjunction with the appended drawing.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 illustrates a rear view of the platform with a pair of spaced driving wheel elements oriented in a forward moving position;

FIG. 6 illustrates a partial perspective view of the platform shown in phantom with the driving wheel elements shown in solid lines;

DESCRIPTION OF THE INVENTION

Figure 1:
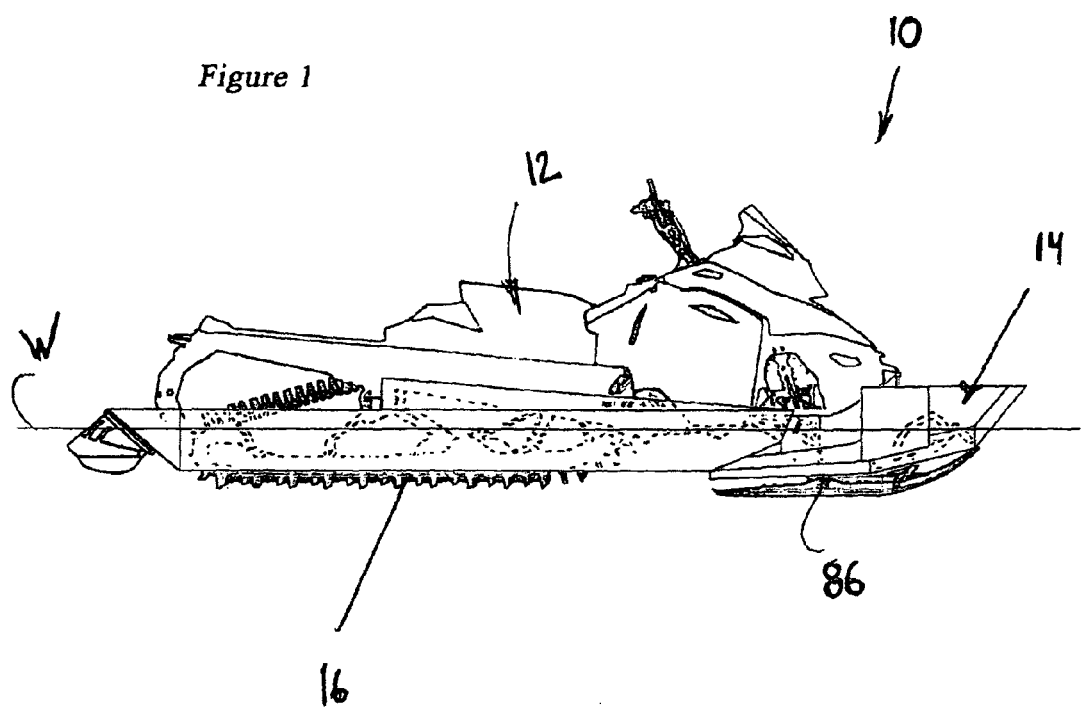
FIG. 1 illustrates a general side view of an inventive platform with a jet ski engaged therewith.
Figure 2:
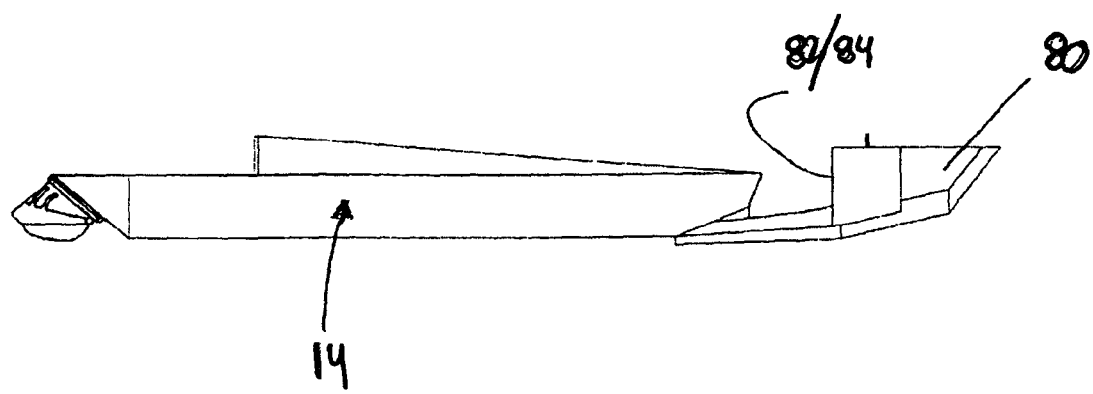
FIG. 2 illustrates a side view of the platform.
Figure 3:
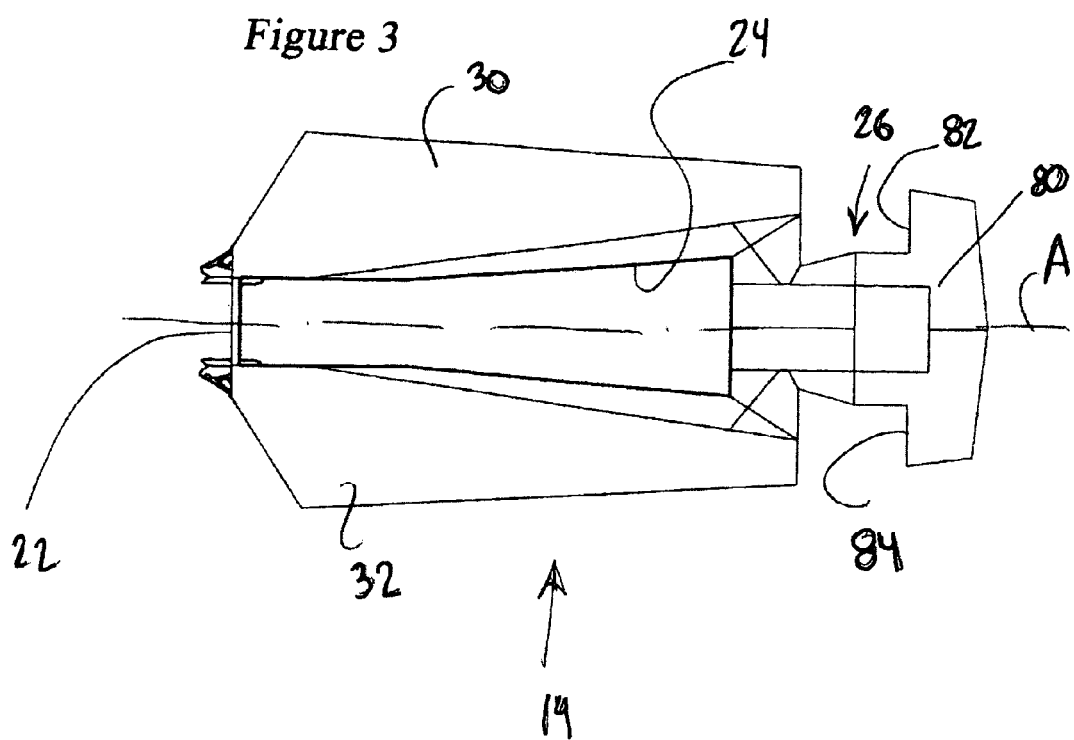
FIGS. 3 and 4 illustrate a top view of the platform and a bottom view of the platform.
Figure 4:
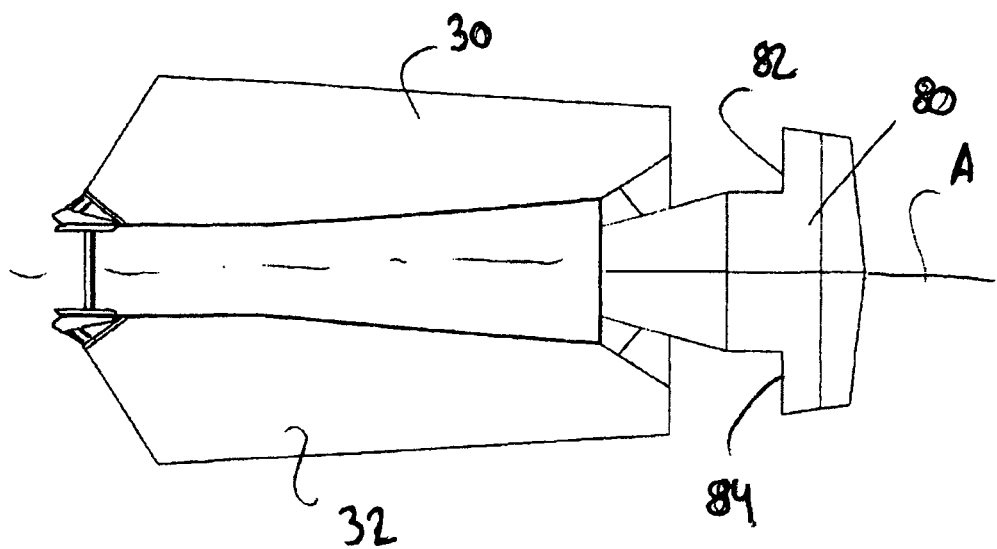
Figure 15:
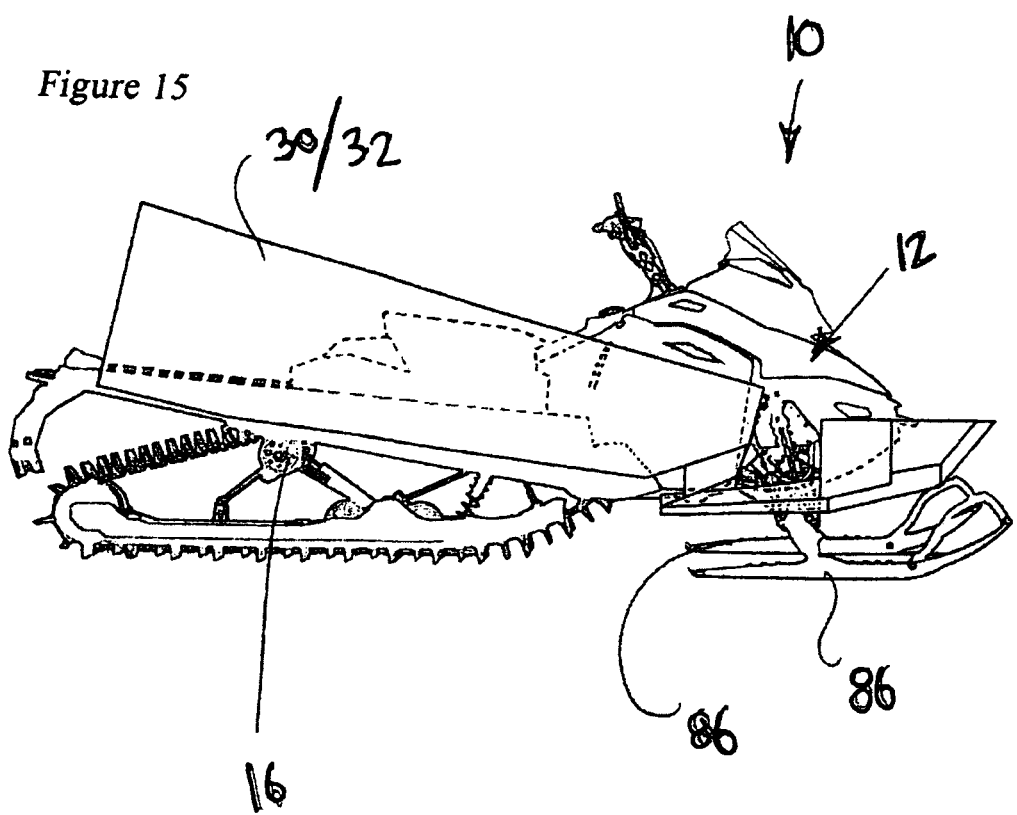
FIG. 15 illustrates a side view of the platform engaged about the snow mobile wherein the side wings are pivoted about each independent axis to compact the platform thereby allowing the snowmobile to move on the snow, wherein use of the platform is not required.

Referring to Figures, wherein like numerals indicate like or corresponding parts throughout the several views, an apparatus of the present invention such as a multipurpose mobility system, is generally shown at 10 in FIGS. 1 and 15. The multipurpose mobility system 10 includes a land vehicle, such as a snowmobile, generally indicated at 12 in FIGS. 1 and 15, a platform, generally indicated and/or generally shown at 14 in FIGS. 1 through 17. The platform 14 is removable engageable with the land vehicle 12 with driving arrangements 16, such as an engine and all other driving mechanisms, without limiting the scope of the present invention, thereby allowing to move the land vehicle 12 on and within the platform 14 on water W, as shown in FIG. 1, and any other fluid and ice surfaces.

The platform 14 is formed from metallic material, polymeric materials and combination thereof without limiting the scope of the present invention. The platform 14 can be manufactured by reaction injection molding methods and any other injection molding technologies and can be casted without limiting the scope of the present invention. The platform 14 can also be fabricated from carbon fiber. The platform 14 includes a bottom portion 20 and a rear portion 22 and a central axis A bisecting the bottom portion 20 and the rear portion 22. The platform 14 includes several openings 24, 26 defined in the bottom portion 20 to receive the land vehicle 12 thereby exposing the driving arrangements 16 of the land vehicle 12 to water W to allow to move the land vehicle 12 positioned on the platform 14 along water W.

Figure 16:
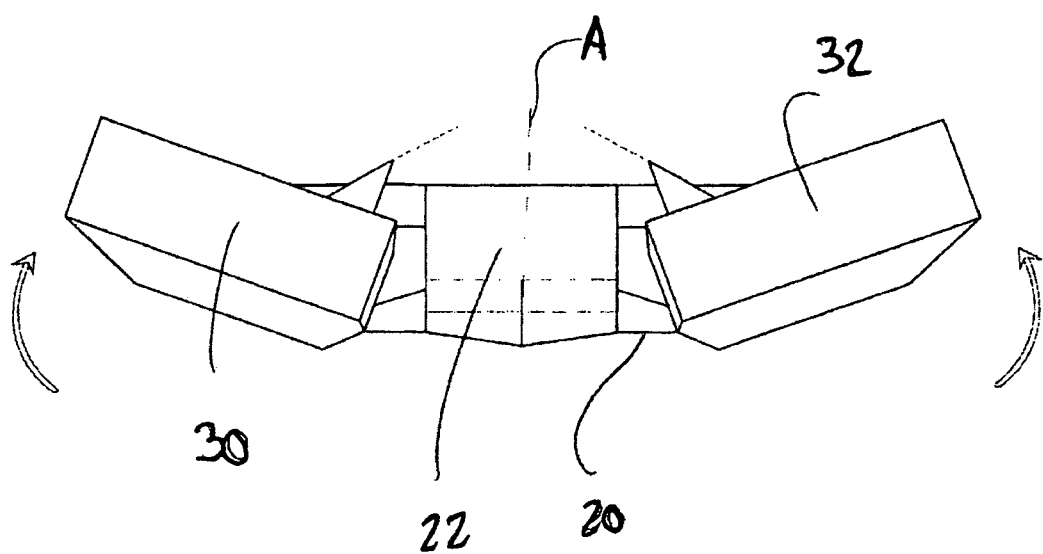
FIG. 16 illustrates a side view of the platform wherein both side wings are partially pivoted about each independent axis to compact the platform.
Figure 17:
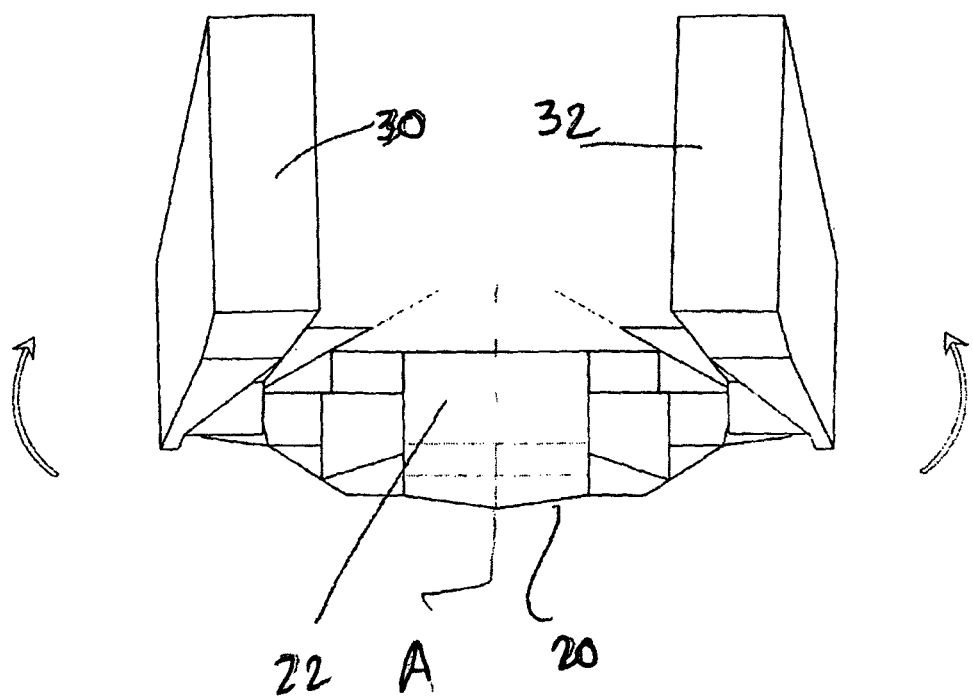
FIG. 17 illustrates another side view of the platform wherein both side wings are fully pivoted about each independent axis and positioned substantially perpendicular to the bottom of the platform to fully compact the platform thereby allowing the snowmobile to move on the snow, wherein use of the platform is not required.

A pair of side portions or wings 30 and 32 of the platform 14 is pivotable about each pivoting axis B, which is independent from the central axis A. The side portions 30 and 32 are pivoted away from the bottom portion 20 to compact the platform 14 thereby allowing the land vehicle 12 to move on surfaces other than water wherein use of the platform 14 is not required. FIG. 16 illustrates a side view of the platform 14 wherein both side wings 30 and 32 are partially pivoted about each independent axis to compact the platform 14. FIG. 17 illustrates another side view of the platform 14 wherein both side wings 30 and 32 are fully pivoted about each independent axis and positioned substantially perpendicular to the bottom 20 of the platform 14 to fully compact the platform 14 thereby allowing the snowmobile 12 to move on the snow, wherein use of the platform 14 is not required to be used.

A pair of driving wheel devices, generally indicated at 40 and 42, is rotatable about each respective wheel axis C and are connected to the rear portion 22. The driving wheel devices 40 and 42 are spaced from one another. Each of the driving wheel devices 40 and 42 presents several wheel elements, i.e. a first wheel element 44 and a second wheel element 46 mechanically engaged with one. The first wheel element 44 and the second wheel element 46 are formed from metallic material, polymeric materials and combination thereof without limiting the scope of the present invention. The first wheel element 44 and the second wheel element 46 can be manufactured by reaction injection molding methods and any other injection molding technologies and can be casted without limiting the scope of the present invention.

Alluding to the above, the mechanical engagement between the first wheel element 44 and the second wheel element 46 allows these two elements 44 and 46 to collapse one into the other as the platform 14 runs over an obstacle 48, as shown in FIGS. 9 through 12, in a shallow water areas as each of the driving wheel devices 40 and 42 is rotatable about the respective wheel axis C as the platform 14 turns and moves into various directions, as shown in FIGS. 7A through 12. The first wheel element 44 and the second wheel element 46 include a flat and generally "plate" like and triangular configuration. Other configurations may be used and the "plate" like and triangular configuration as shown in Figures of the present description is not intended to limit the scope of the present invention.

Alluding to the above, each of driving wheel devices 40 and 42 includes a neck portion 52 pivotable movable about the wheel axis C. The first wheel element 44, i.e. a first section, is connected to and extends from the neck portion 52. The second wheel element 46, i.e. a second section, is pivotable about the first section 44 and extends to and away from the first section 44 about a pivoting point 54 shared by the first section 44 and the second section 46. Each first section 44 includes an extension element, or a limiter 60 and a pair of tracks 62 and 64 defined therein. The second section 46 includes a pair of fingers 66 and 68 extending therefrom to mechanically engage within the tracks 62 and 64 of the first section 44.

Figure 13:
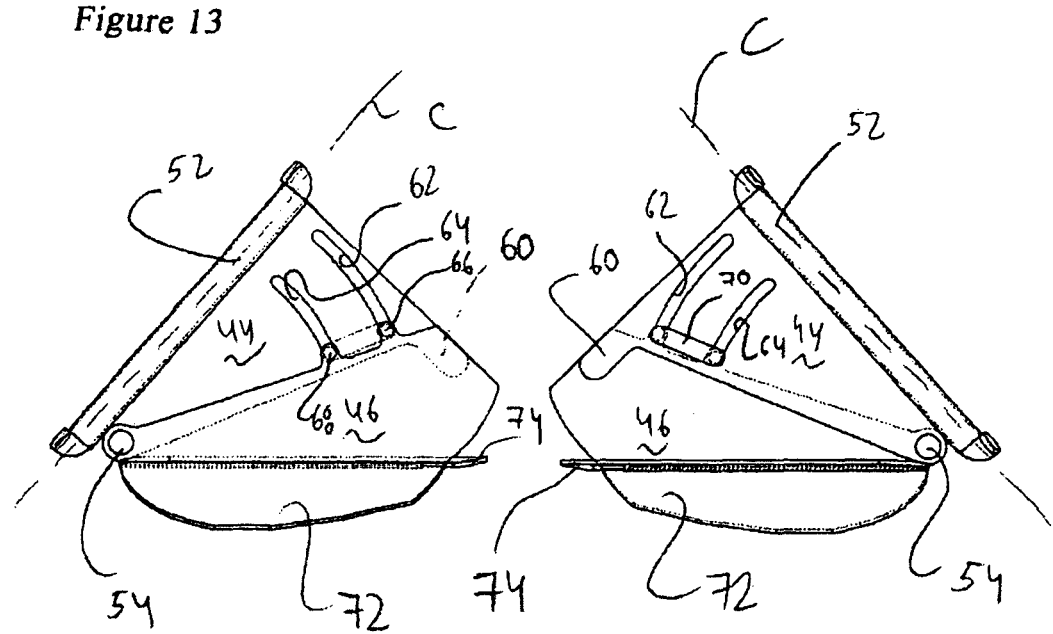
FIG. 13 illustrates front view of the driving wheel elements.
Figure 14:
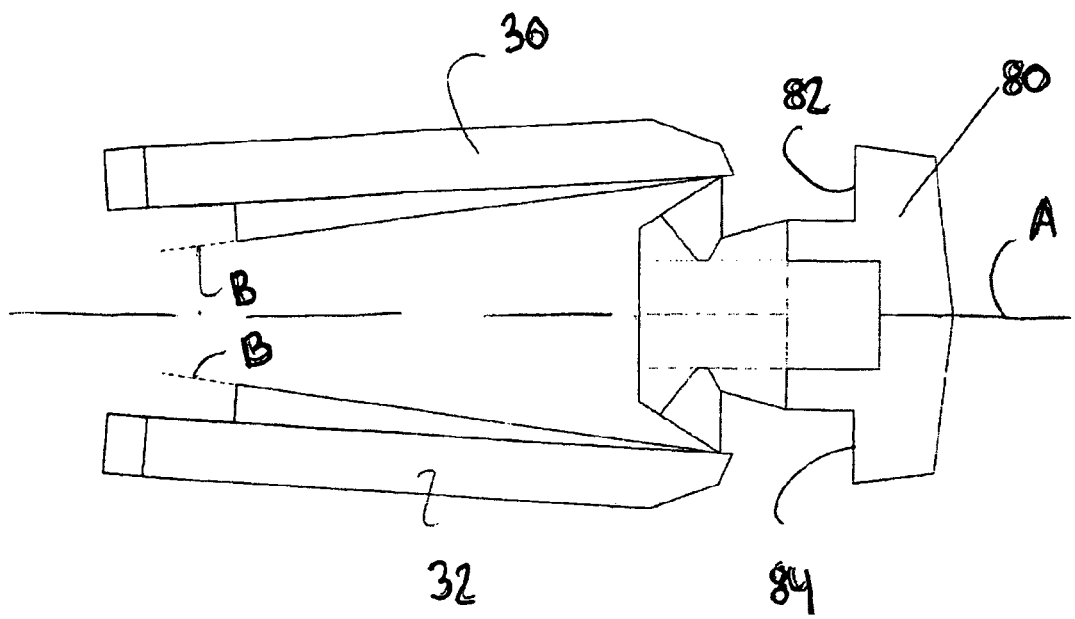
FIG. 14 illustrates a top view of the platform wherein side wings are pivoted about each independent axis to compact the platform thereby allowing the snowmobile or any other locomotion device that uses the platform to move in environment wherein use of the platform is not required.

As best shown in FIG. 13, a connector device 70 joins the fingers 66 and 68 in order to lock the second section 46 with the first section 44. A third element, such as a vertical wheel rib 72 is connected to and extends from the second section 46. A forth element, such as rigidity and strengthening plate 74 is connected to and extends from the second section 46 at intersection between the second section 46 and the vertical wheel rib 72. The second section 46, the vertical wheel rib 72 element and the rigidity and strengthening plate 74 extend in various directions relative to one another and the central axis A. Each of the wheel axis C are diverging in relationship to the central axis A.

Alluding to the above, the first section 44, the second section 46, the vertical wheel rib 72, and the rigidity and strengthening plate 74 are formed from a polymeric material. Alternatively, the first section 44, the second section 46, the vertical wheel rib 72, and the rigidity and strengthening plate 74 are formed from a metal. Each of said pivoting axis B of the side portions are independent from the central axis A of the side portions and diverge from the central axis A.

Referring to FIGS. 2, 3, 4, and 14, the platform 14 includes a front portion 80 presenting a generally T-Shape configuration to define a pair of cut out portions 82 and 84 on both side of the central axis A to receive front skies 86 of the land vehicle 12.

Figure 7B:
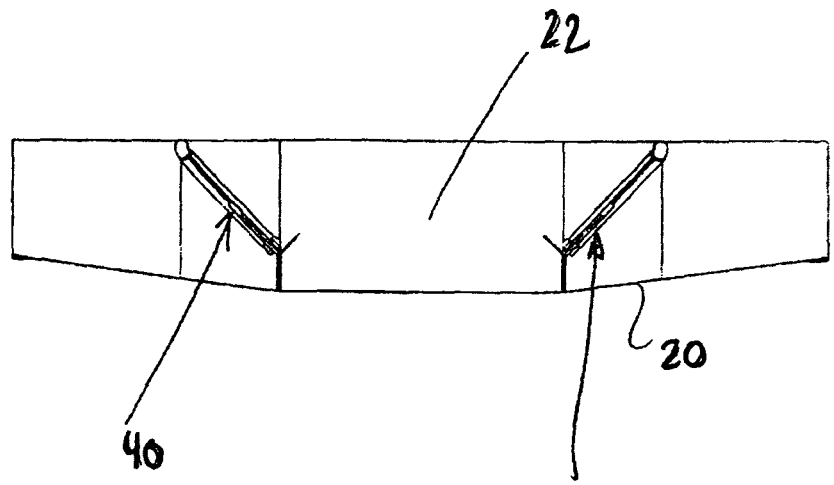
FIG. 7B illustrates a view taken from a bottom of the platform with the pair of spaced driving wheel elements oriented in the forward moving, sailing position, as shown by an arrow.
Figure 7A:
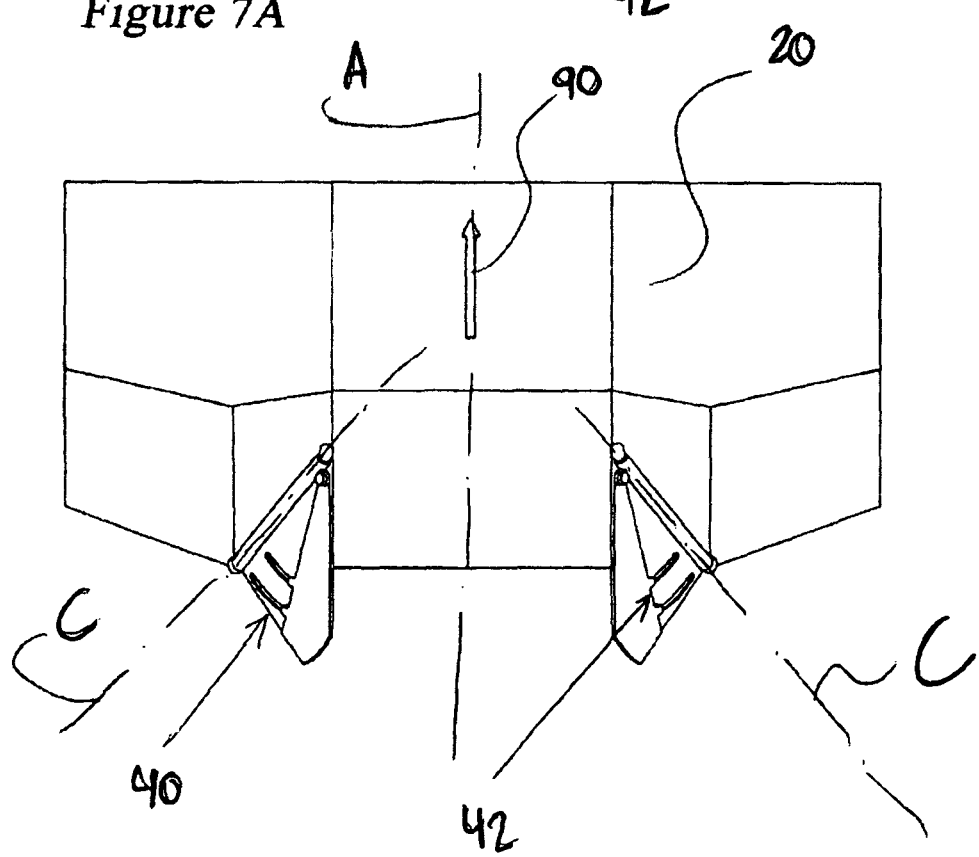
FIG. 7A illustrates another rear view of the platform with the pair of spaced driving wheel elements oriented in a forward moving, sailing position.

FIG. 7A illustrates a rear view of the platform 14 with the pair of spaced driving wheel elements 40 and 42 oriented in a forward moving, sailing position. FIG. 7B illustrates a view taken from a bottom of the platform 14 with the pair of spaced driving wheel elements 40 and 42 oriented in the forward moving, sailing position, as shown by an arrow 90.

Figure 8B:
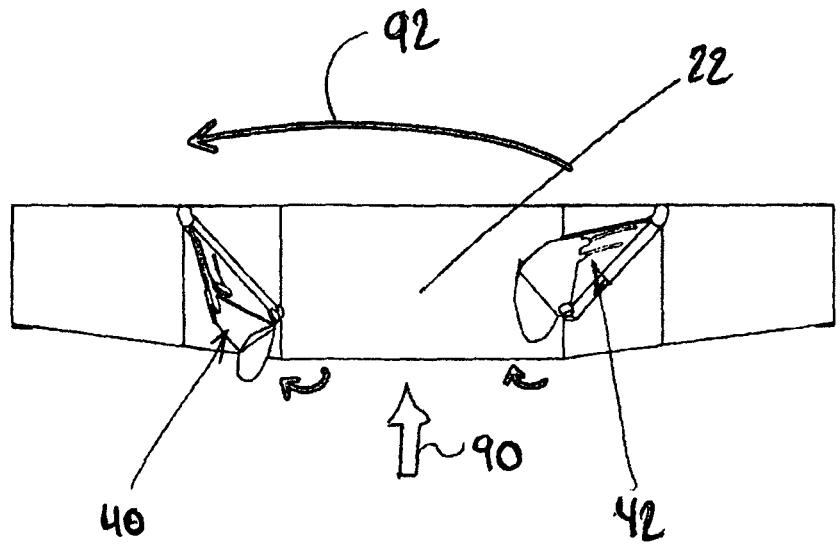
FIG. 8B illustrates a view taken from a bottom of the platform with the pair of spaced driving wheel elements oriented in the first turning position as the platform is turning to one side away from sailing forward.
Figure 8A:
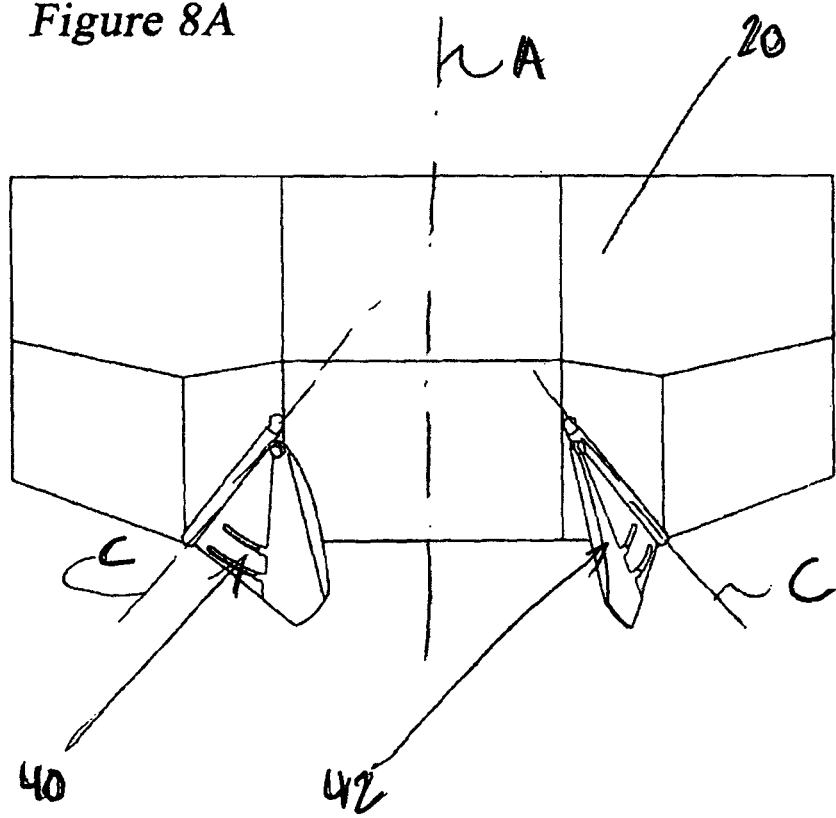
FIG. 8A illustrates another rear view of the platform with the pair of spaced driving wheel elements oriented in a first turning position as the platform is turning to one side away from sailing forward.

FIGS. 8A and 8B illustrates another rear view of the platform 14 with the pair of spaced driving wheel elements 40 and 42 oriented in a first turning position 92 as the platform 14 is turning to one side away from sailing forward, as shown at 90. Unique configuration and mechanical engagement between the first section 44, the second section 46, the vertical wheel rib 72, and the rigidity and strengthening plate 74, allows the platform 14 to stay stable and prevents from flipping and skidding over, and the turns are made from a straight course at various speeds.

Figure 9:
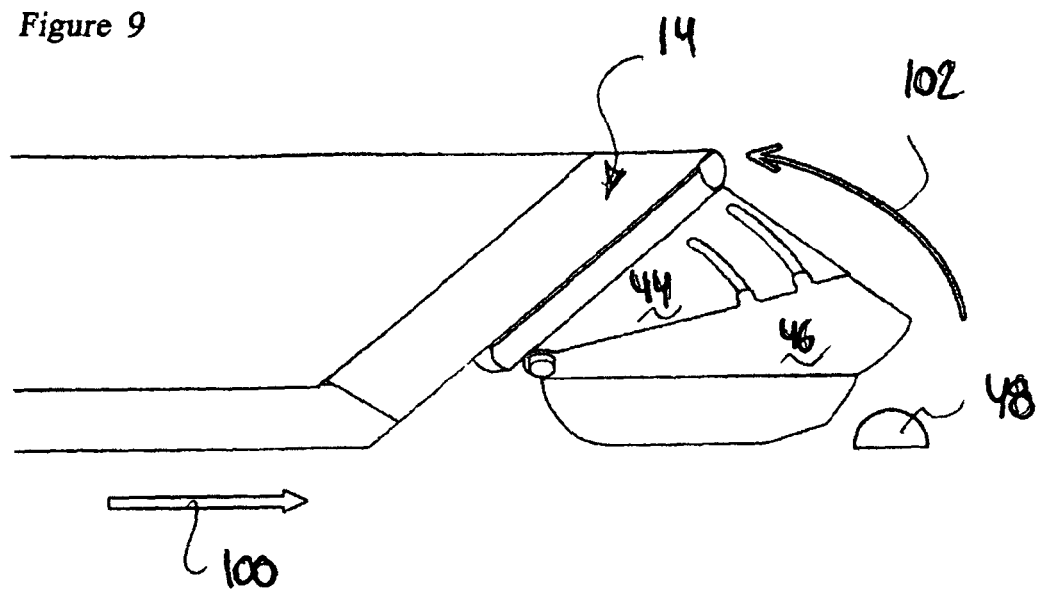
FIGS. 9 through 12 illustrate various partially cross sectional views of the platform showing one driving wheel element position before an obstacle as the platform moves against the obstacle as shown by the arrow, wherein multiple element that comprise the driving wheel element will collapse one to the other to escape the obstacle thereby allowing the platform to avoid the obstacle.
Figure 10:
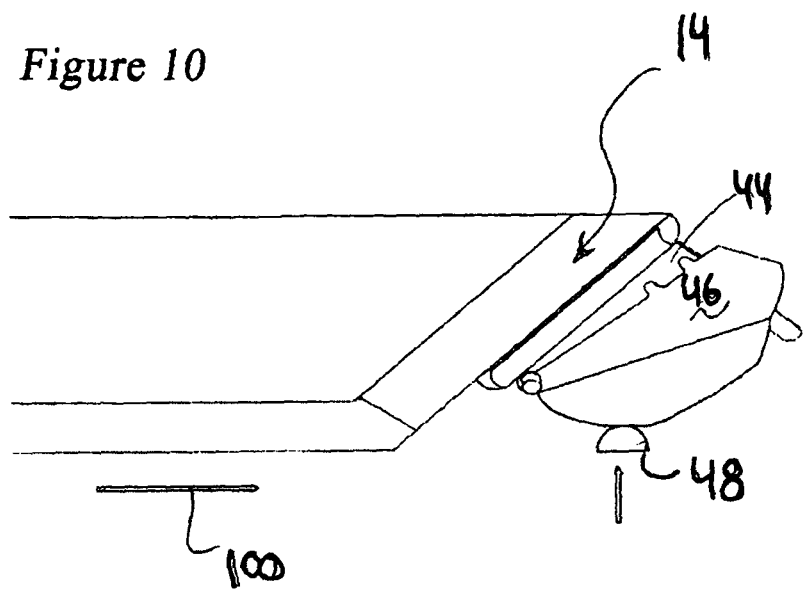
Figure 11:
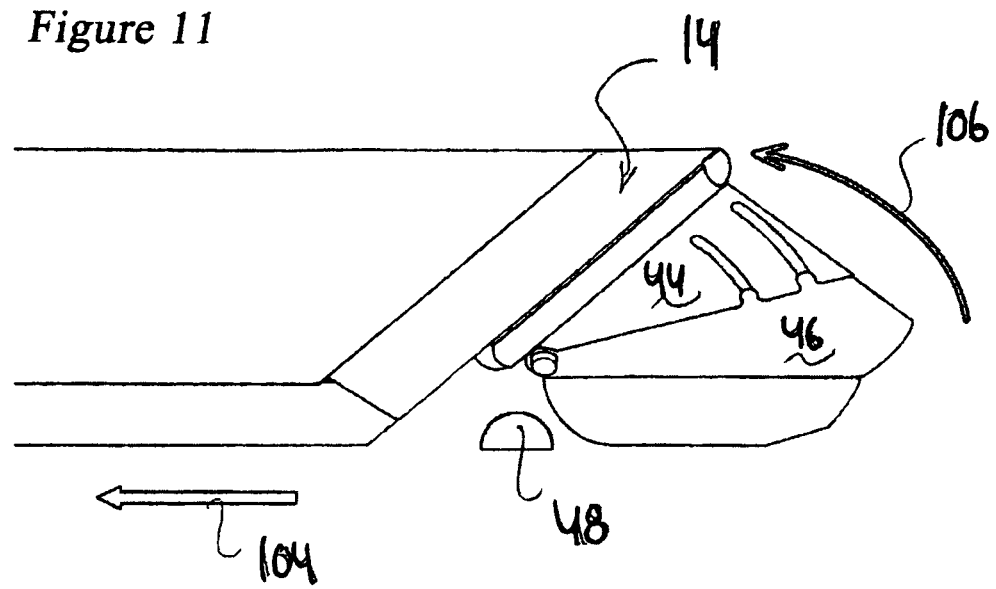
Figure 12:
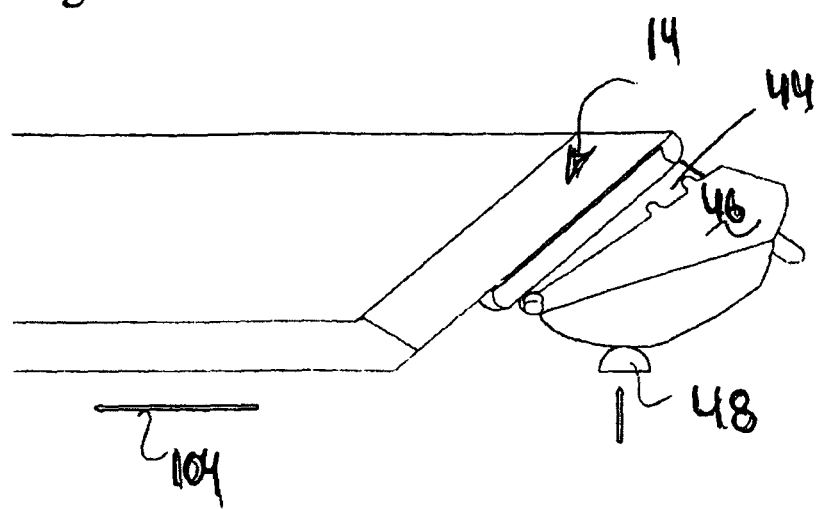

FIGS. 9 through 12 illustrate movement of the platform 14 in shallow waters or in any environment wherein the obstacles 48 are present. FIGS. 9 and 10 show the rear movement position of the platform 14. FIG. 9 shows the platform 14 moving towards 100 the obstacle 48 and ready for the second section 46 to collapse or fold in to the first section 44, as shown at 102. FIG. 10 shows the platform 14 passing over the obstacle 48 wherein the second section 46 is collapse or folded into the first section 44. FIGS. 11 and 12 show the front movement position of the platform 14. FIG. 11 shows the platform 14 moving towards 104 the obstacle 48 and ready for the second section 46 to collapse or fold in to the first section 44, as shown at 106. FIG. 12 shows the platform 14 passing over the obstacle 48 wherein the second section 46 is collapse or folded into the first section 44.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A multipurpose mobility system comprising; a land vehicle, a platform removable engageable with said land vehicle with driving arrangements thereby allowing to move said land vehicle on said platform on water, said platform including a bottom portion and a rear portion and a central axis bisecting said bottom portion and said rear portion with at least one opening defined in said bottom portion to receive said land vehicle thereby exposing said driving arrangements of said land vehicle to water to allow to move said land vehicle positioned on said platform along water, a pair of side portions of said platform pivotable about each pivoting axis independent from said central axis and away from said bottom portion to compact said platform thereby allowing said land vehicle to move on surfaces other than water wherein use of said platform is not required, and a pair of driving wheel devices rotatable about each respective wheel axis and connected to said rear portion and spaced from one another, each of said driving wheel devices presenting at least two elements mechanically engaged with one another thereby allowing said two elements of each of said driving wheel devices to collapse one into the other as said platform runs over an obstacle in water areas as each of said driving wheel devices is rotatable about the respective wheel axis as said platform turns into various directions.

2. The multipurpose mobility system as set forth in claim 1, wherein each of said driving wheel devices includes a neck portion pivotable movable about said wheel axis, a first section connected to and extending from said neck portion, a second section pivotable about said first section and extending to and away from said first section about a pivoting point shared by said first section and said second section.

3. The multipurpose mobility system as set forth in claim 2, wherein said first section includes an extension element and a pair of tracks defined therein.

4. The multipurpose mobility system as set forth in claim 3, wherein said second section includes a pair of fingers extending therefrom to mechanically engage within said tracks of said first section and a connector device joining said fingers in order to lock said second section with said first section.

5. The multipurpose mobility system as set forth in claim 4, including a third element connected to and extending from said second section.

6. The multipurpose mobility system as set forth in claim 5, including a forth element connected to and extending from said second section at intersection between said second section and third element.

7. The multipurpose mobility system as set forth in claim 6, wherein said second section, said third element and said fourth element extend in various directions relative to one another and said central axis.

8. The multipurpose mobility system as set forth in claim 7, wherein each of said wheel axis are diverging in relationship to said central axis.

9. The multipurpose mobility system as set forth in claim 8, wherein said first section, said second section, said third element and said fourth element are formed from a polymeric material.

10. The multipurpose mobility system as set forth in claim 8, wherein said first section, said second section, said third element and said fourth element are formed from a metal.

11. The multipurpose mobility system as set forth in claim 1, each of said pivoting axis of said side portions independent from said central axis of said side portions diverge from said central.

12. The multipurpose mobility system as set forth in claim 1, wherein said platform includes a front portion presenting a generally T-Shape configuration to define a pair of cut out portions on both side of said central axis to receive front skies of said land vehicle.

13. The multipurpose mobility system as set forth in claim 1, wherein said platform is formed from a polymeric material.

14. The multipurpose mobility system as set forth in claim 1, wherein said platform is formed from a metal.

15. A multipurpose mobility system for a snowmobile vehicle having driving arrangements and front skies, said multipurpose mobility system comprising: a platform removable engageable with the snowmobile driving thereby allowing to move the snowmobile on said platform on water, said platform including a bottom portion and a rear portion and a central axis bisecting said bottom portion and said rear portion with at least one opening defined in said bottom portion to receive the snowmobile thereby exposing the driving arrangements of the snowmobile to water to allow to move the snowmobile positioned on said platform along water; and a pair of driving wheel devices rotatable about each respective wheel axis and connected to said rear portion and spaced from one another, each of said driving wheel devices presenting at least two elements mechanically engaged with one another thereby allowing said two elements of each of said driving wheel devices to collapse one into the other as said platform runs over an obstacle in water areas as each of said driving wheel devices is rotatable about the respective wheel axis as said platform turns into various directions.

16. The multipurpose mobility system as set forth in claim 15, including a pair of side portions of said platform pivotable about each pivoting axis independent from said central axis and away from said bottom portion to compact said platform thereby allowing the snowmobile to move on surfaces other than water wherein use of said platform is not required.

17. The multipurpose mobility system as set forth in claim 15, wherein each of said driving wheel devices includes a neck portion pivotable movable about said wheel axis, a first section connected to and extending from said neck portion, a second section pivotable about said first section and extending to and away from said first section about a pivoting point shared by said first section and said second section.

18. The multipurpose mobility system as set forth in claim 17, wherein said first section includes an extension element and a pair of tracks defined therein.

19. The multipurpose mobility system as set forth in claim 18, wherein said second section includes a pair of fingers extending therefrom to mechanically engage within said tracks of said first section and a connector device joining said fingers in order to lock said second section with said first section, a third element connected to and extending from said second section, and a forth element connected to and extending from said second section at intersection between said second section and third element.

20. The multipurpose mobility system as set forth in claim 19, wherein said second section, said third element and said fourth element extend in various directions relative to one another and said central axis, each of said wheel axis are diverging in relationship to said central axis, each of said pivoting axis of said side portions independent from said central axis of said side portions diverge from said central, said platform includes a front portion presenting a generally T-Shape configuration to define a pair of cut out portions on both side of said central axis to receive front the skies of the snowmobile.

\* \* \* \* \*